United States Patent [19]
Nakayama et al.

[11] 3,816,251
[45] June 11, 1974

[54] PROCESS FOR PRODUCING ADENOSINE-3,5-CYCLIC MONOPHOSPHORIC ACID BY FERMENTATION

[75] Inventors: Kiyoshi Nakayama, Sagamihara; Akira Furuya, Kawasaki; Masayo Ukita, Tokyo, all of Japan

[73] Assignee: Kyowa Hakko Kogyo Co., Ltd., Tokyo, Japan

[22] Filed: Apr. 13, 1972

[21] Appl. No.: 243,869

[30] Foreign Application Priority Data
May 7, 1971 Japan.............................. 46-29803
May 7, 1971 Japan.............................. 46-29804

[52] U.S. Cl............................................... 195/28 N
[51] Int. Cl........................................... C12d 13/06
[58] Field of Search................................... 195/28 N

[56] References Cited
UNITED STATES PATENTS
3,298,923  1/1967  Banno et al...................... 195/28 N
3,630,842  12/1971  Ishiyama et al................. 195/28 N Primary Examiner—Alvin E. Tanenholtz
Attorney, Agent, or Firm—Fitzpatrick, Cella, Harper & Scinto

[57] ABSTRACT

Adenosine-3',5'-cyclic monophosphoric acid is produced by fermentation of a nutrient medium, containing a fluoride, by a microorganism which is capable of producing the nucleotide. The adenosine-3',5'-cyclic monophosphoric acid is accumulated in the culture medium and is thereafter recovered therefrom.

8 Claims, No Drawings

PROCESS FOR PRODUCING ADENOSINE-3,5-CYCLIC MONOPHOSPHORIC ACID BY FERMENTATION

BACKGROUND OF THE INVENTION

The present invention relates to a process for producing adenosine-3',5'-cyclic monophosphoric acid by fermentation.

Adenosine-3',5'-cyclic monophosphoric acid is a nucleotide and is a physiologically important substance which controls various hormone actions in the higher animals, and is an important medicament. The product of the present invention may be characterized by the following formula:

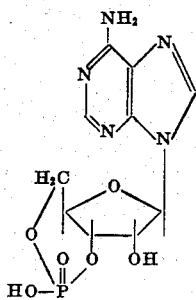

It is known to produce adenosine-3',5'-cyclic monophosphoric acid (hereinafter referred to as cAMP) by fermentation. For example, it has heretofore been known from French Patent No. 2,015,396 that by cultivating a microorganism belonging to the genus Arthrobacter, Corynebacterium, or Microbacterium and having an ability to form and accumulate cAMP from adenine, adenosine, hypoxanthine, inosine, 5-amino-4-imidazolecarboxamide, 5-amino-4-imidazolecarboxamide riboside, succinyladenine or succinyladenosine, cAMP is accumulated in the culture liquor at a concentration of 1 to 3 mg/ml by adding, at a concentration of 1 to 3 mg/ml, one of the above precursors to the culture medium during cultivation. However, in view of the great importance of cAMP as a medicinal agent, a process which may be completed on an industrial scale which yields higher quantities of the product is in need.

As a result of various studies on the accumulation of cAMP by fermentation, the present inventors have succeeded in accumulating a considerable amount of cAMP by cultivating a bacterium capable of producing cAMP in a medium containing a fluoride such as sodium fluoride, potassium fluoride or the like without adding adenine, adenosine, hypoxanthine, inosine, 5-amino-4-imidazolecarboxamide, 5-amino-4-imidazolecarboxamide riboside, succinyladenine or succinyladenosine.

The above mentioned substances such as adenine, etc. are precursors indispensable in the biosynthesis of purine nucleotides and in the formation of cAMP in living bodies [W. W. Umbreit: Metabolic Map, Vol. II, P 201 (196D) Burgess Publishing Co., Minn.]. On the other hand, fluorides are generally inorganic substances such as sodium fluoride and potassium fluoride, and are generally used as an enzyme inhibitor [R. M Hochster and J. H. Quastel: Metabolic Inhibitor, Vol. I & II (1963) Academic Press, New York]. Therefore, it is obvious that the addition of adenine, etc. and the addition of a fluoride bring about quite different physiological effects on the metabolism of the microorganism. Further, it is reported that sodium fluoride inhibits adenylcyclase which directly takes part in the biosynthesis of cAMP from adenosine triphosphoric acid by a microorganism [M. Tao and F. Lipman: Proc. Natl. Acad. Sci., 63 86 (1969]. It is, therefore, readily inferable that the formation and accumulation of cAMP would be inhibited by the addition of such substance. On the contrary, the present inventors have found that improved amounts of cAMP is accumulated when adding the fluoride without adding any precursor.

Although improved amounts of cAMP is accumulated in the culture medium without the addition of the above-mentioned precursors, the present inventors have also found that improved quantities of cAMP are also accumulated in the medium when both a fluoride and a precursor are present in the medium during culturing.

DESCRIPTION OF THE INVENTION

According to the present invention, adenosine-3',5'-cyclic monophosphoric acid is produced in improved quantities by fermentation of a nutrient medium containing at least one fluoride, by a microorganism which is capable of producing the adenosine-3',5'-cyclic monophosphoric acid. Alternatively, the nutrient medium may contain a fluoride and a substance selected from the group consisting of adenine, adenosine, adenylic acid, hypoxanthine, inosine, inosinic acid, 5-amino-4-imidazolecarboxamide, 5-amino-4-imidazolecarboxamide riboside, 5-amino-4-imidazolecarboxamide ribotide, succinyladenine and succinyladenosine.

Any microorganism may be used in the present invention so long as it is capable of producing adenosine-3',5'-cyclic monophosphoric acid, and a mutant obtained from such a microorganism can be, of course, utilized. Any standard screening test may be used for determining whether a specific microorganism is capable of producing the neucleotide. A candidate organism is inoculated into a suitable sterile nutrient medium and incubated at a suitable temperature. When the microorganism is inoculated or during the course of fermentation, a precursor such as adenine, adenosine or the like and/or a fluoride is added to said medium at a concentration of 1 to 20 g/l in the case of the former or 1 to 2000 mg/l in the case of the latter. After the completion of culturing, the resultant culture is compared with a control to which no additive is given. The yield of cAMP in the medium is measured by any conventional method such as paper chromatography, ultraviolet absorption or the like. Alternatively, promising candidates can be evaluated by quantitative assay of cAMP produced. Specifically suitable microorganisms are: *Corynebacterium murisepticum* ATCC 21374, Arthrobacter sp. ATTC 21375 and Microbacterium sp. ATCC 21376. These strains are deposited with the American Type Culture Collection, Rockville, Md., and are available to the public.

Either a synthetic or natural medium may be used as a medium in the present invention, so long as it contains appropriate amounts of a carbon source; an organic or inorganic nitrogen source; an inorganic salt and, if necessary, specific nutrients. Any kinds of carbon sources and nitrogen sources are suitable so long as they can be utilized by the strains employed. That is to say, as a carbon source various carbohydrates such as glucose, fructose, sucrose, maltose, mannitol, galactose, ribose, starch, starch hydrolyzate solution, molasses, etc.; various organic acids such as gluconic acid, pyruvic acid, lactic acid, acetic acid, etc.; alcohols such as glycerol, etc.; hydrocarbons such as normal paraffins, kerosene, etc.; and amino acids such as glycine, glutamic acid, alanine, glutamine, and asparagine, etc. are appropriate. As a nitrogen source, ammonia; various inorganic and organic ammonium salts such as ammonium chloride, ammonium phosphate, ammonium sulfate, ammonium nitrate, ammonium carbonate, ammonium acetate, etc.; urea; nitrogeneous organic substances such as peptone, casein hydrolyzate, meat extract, yeast extract, corn steep liquor, fish meal or its digested product, and the like; and others such as glycine, glutamic acid, alanine, etc. may be used. Further, potassium dihydrogen phosphate, dipotassium hydrogen phosphate, magnesium sulfate, calcium carbonate, etc. are suitable as inorganic salts. When a microorganism, which further requires a specific nutrient is used, a material, which satisfies the requirement, must be added to the culture medium as a matter of course.

The fluoride is added to the nutrient medium to a concentration of 1 - 2000 mg/l. The fluoride may be added to the fermentation medium when the medium is prepared, or a fluoride solution may be prepared separately and subsequently added to the medium either when the microorganism is inoculated or during the course of fermentation. The present invention contemplates the utilization of various fluorides such as sodium fluoride, potassium fluoride, calcium fluoride, magnesium fluoride, lithium fluoride, barium fluoride, ammonium fluoride, zinc fluoride, etc.

The microorganism is preferably grown in a seed medium prior to inoculation into the culture medium. The seed cultivation is carreid out under favorable growth conditions for a period of time to develop a suitable organism population, typically from 12 to 24 hours. The seed culture is then inoculated into the culture medium.

In the alternative embodiment of the invention, one or more precursors are also added to the culture medium. Appropriate precursors are selected from the group consisting of adenine, adenosine, adenylic acid, hypoxanthine, inosine, inosinic acid, 5-amino-4-imidazolecarboxamide, 5-amino-4-imidazolecarboxamide riboside, 5-amino-4-imidazolecarboxamide ribotide, succinyladenine and succinyladenosine. The precursor is added to the culture medium at a suitable concentration, preferably 1 - 20 g/l when the microorganism is inoculated or during the course of fermentation.

Fermentation is carried out under aerobic conditions, for example, by shaking cultivation, aeration-stirring submerged cultivation, or the like. Culturing temperature is preferably 20°C to 40°C. and the medium is advantageously maintained at a pH of 4 - 10. Culturing time is usually 10 to 120 hours, whereby a considerable amount of cAMP is accumulated in the culture liquor.

After the completion of culturing, cAMP is recovered from the culture liquor by ion exchange resin treatment such as is shown in the following Example 1. It is also possible to recover cAMP by any other well known ion exchange resin treatment, adsorption, precipitation, extraction or the like.

Practice of certain specific embodiments of the present invention is illustrated by the following representative examples.

EXAMPLE 1

In this example, a seed culture liquor is obtained by cultivating Microbacterium sp. ATCC 21376 in a seed medium containing 1 percent glucose, 1 percent peptone, 1 percent meat extract, 1 percent yeast extract and 0.3 percent sodium chloride at 30°C for approximately 12 hours. A fermentation medium containing 5 percent glucose, 1 percent potassium dihydrogen phosphate, 1 percent dipotassium hydrogen phosphate, 1 percent magnesium sulfate, 10 mg/l cobaltous chloride, 30 μg/l biotin, 100 mg/l sodium fluoride, 0.5 percent peptone and 1 percent urea is prepared and adjusted to pH 7.6 before sterilization. 30 ml of the fermentation medium is added to a 250 ml capacity conical flask, sterilized under elevated pressure at 120°C for 10 minutes, and thereafter inoculated with the seed culture to a ratio of 10 percent by volume. Shaking cultivation is carried out at 30°C for 72 hours, whereby 3.3 mg/ml of cAMP is accumulated in the culture liquor.

1 l. of a filtrate, obtained by filtering cells and precipitates from the culture liquor, is adjusted to pH 3.0 with hydrochloric acid, and active carbon is added thereto. The filtrate is actively stirred, whereby cAMP contained in the filtrate is adsorbed into the active carbon. After separation of the active carbon by filtration, the cAMP adsorbed therein is eluted with an ammoniacal ethanol solution, and the eluate is concentrated under reduced pressure. The concentrated solution is passed through a column of Dowex 1 × 2 (Dow Chemical Company) Cl-form resin. The resin is washed with water, and then subjected to elution with a a dilute hydrochloric acid solution. A fraction containing cAMP is collected and concentrated under reduced pressure. Then, ethanol is added thereto, whereby 1.8 g of crude crystals is obtained. The crude crystals are further recrystallized, and all data of elementary analysis, determination of base, sugar and phospholic acid contents, ultraviolet absorption spectrum, infra-red absorption spectrum, Rf value on paper chromatogram, etc of the product revealed that the product is adenosine-3',5'-cyclic monophosphoric acid.

EXAMPLE 2

In this example, *Corynebacterium murisepticum* ATCC 21374 is used as a seed microorganism, and a suitable seed culture is inoculated into a fermentation medium comprising 5 percent glucose, 0.1 percent potassium dihydrogen phosphate, 0.3 percent dipotassium hydrogen phosphate, 0.1 percent magnesium sulfate, 1 percent corn steep liquor, 0.3 percent casamino acid, 200 mg/l of potassium fluoride, 1.5 percent urea, which was adjusted to pH 7.5 before sterilization. Cultivation is carried out with shaking at 30°C for 60 hours in the same manner as in Example 1. As a result 2.3 mg/ml of cAMP is accumulated in the culture liquor. A control is also run wherein no potassium fluoride is added to the culture medium. As a result only 0.2 mg/ml of cAMP is formed.

EXAMPLE 3

In this example, Arthrobacter sp. ATCC 21375 is used as a seed microorganism. The cultivating method and the composition of the medium are the same as in Example 1, with the exception that sodium fluoride is added to the medium at a concentration of 100 mg/l 24 hours after the start of cultivation. Cultivation is carried out at 32°C for 96 hours, resulting in 2.1 mg/ml of cAMP accumulated in the culture liquor. On the other hand, in the medium of a control where no sodium fluoride is added, almost no cAMP is formed.

EXAMPLE 4

In this example, cultivation is carried out for 72 hours using the same strain as in Example 1, in the same manner as in Example 1, except that a medium containing 100 mg/l of magnesium fluoride in place of sodium fluoride is used. As a result, 3.0 mg/ml of cAMP is accumulated in the culture liquor. On the other hand, in the medium of a control where no magnesium fluoride is added, almost no cAMP is formed.

EXAMPLE 5

In this example, cultivation is carried out for 60 hours using the same strain as in Example 2, in the same manner as in Example 2, except that a medium containing 200 mg/l of lithium fluoride in place of potassium fluoride is used. As a result, 2.1 mg/ml of cAMP is accumulated in the culture liquor. On the other hand, in the medium of a control where no lithium fluoride is added, almost no cAMP is formed.

EXAMPLE 6

In this example, a seed culture liquor is obtained by cultivating Microbacterium sp. ATCC 21376 in a medium containing 1 percent glucose, 1 percent peptone, 1 percent meat extract, 1 percent yeast extract and 0.3 percent sodium chloride at 30°C for approximately 12 hours. A fermentation medium containing 5 percent glucose, 1 percent potassium dihydrogen phosphate, 1 percent dipotassium hydrogen phosphate, 1 percent magnesium sulfate, 10 mg/l cobaltous chloride, 30 μg/l biotin, 100 mg/l sodium fluoride, 0.5 percent peptone and 1 percent urea is prepared. After being adjusted to pH 7.6, 30 ml of the fermentation medium is added to a 250 ml conical flask and sterilized under elevated pressure at 120°C for 10 minutes. The seed culture is then inoculated into the thus prepared medium to a ratio of 10 percent by volume and subjected to shaking cultivation at 30°C for 72 hours. At periods of 20 and 40 hours after the start of cultivation, adenine is added to the medium to attain a concentration of 2 mg/ml for each addition. As a result, 9.7 mg/ml of cAMP is accumulated in the culture liquor. As a control, the same cultivation is carried out using a fermentation medium containing no sodium fluoride. As a result, only 2.1 mg/ml of cAMP is accumulated.

EXAMPLE 7

In this example, Microbacterium sp. ATCC 21376 is used as a seed microorganism and cultivation is carried out in the same medium and under the same conditions as in Example 6. As a control, the same cultivation is carried out using a fermentation medium containing no sodium fluoride. As a precursor, each substance in Table 1 is added in the amount and times as shown in Table 1. After 72 hours of cultivation at 30°C the results are shown below.

Table 1

| Precursor | amount added | Time | cAMP | |
|---|---|---|---|---|
| | 0 hour | 20 hours | NaF added | No NaF added |
| Adenosine | 0 mg/ml | 4 mg/ml | 4.7 mg/ml | 2.3 mg/ml |
| Hypoxanthine | 3 | 0 | 7.1 | 2.4 |
| Inosine | 0 | 5 | 5.8 | 2.2 |
| AICA* | 3 | 0 | 6.4 | 1.8 |
| AICAR** | 4 | 5.1 | 2.4 | 0 |

*5-amino-4-imidazolecarboxamide
**5-amino-4-imidazolecarboxamide riboside

EXAMPLE 8

In this example, Arthrobacter sp. ATCC 21375 is used to prepare a seed culture and a fermentation medium is prepared having the following composition: 5 percent glucose; 0.1 percent potassium dihydrogen phosphate; 0.3 percent dipotassium hydrogen phosphate; 0.1 percent magnesium sulfate; 1 percent corn steep liquor; 0.5 percent casamino acid; 1.5 percent urea and adjusted to pH 7.5 before sterilization. Cultivation of the fermentation medium is carried out according to the same method as in Example 6, with the exception that potassium fluoride is added thereto at a concentration of 200 mg/l when inoculation is carried out. As a control, a medium containing no potassium fluoride is also subjected to cultivation. The respective precursors as shown in the following Table 2 are added to the medium at the times and in the amounts as shown in Table 2, and cultivation is carried out at 30°C for 60 hours. As a result, cAMP is observed to be accumulated in the culture liquor in the amounts as shown in Table 2.

Table 2

| Precursor | | | cAMP | |
|---|---|---|---|---|
| | 0 hour | 20 hours | KF added | No KF added |
| Hypoxanthine | 3 mg/ml | 3 mg/ml | 5.2 mg/ml | 1.8 mg/ml |
| Adenosine | 0 | 4 | 4.8 | 1.6 |
| Succinyladenine | 2 | 2 | 5.7 | 2.2 |
| Succinyladenosine | 2 | 2 | 4.3 | 1.7 |

EXAMPLE 9

In this example, Corynebacterium murisepticum ATCC 21374 is used as a seed microorganism and cultivated according to the method of Example 6 with the exception that sodium fluoride is added to the fermentation medium at a concentration of 100 mg/l 20 hours after the start of cultivation together with the respective precursors as shown in Table 3. After cultivation at 30°C for 90 hours, the results as shown in Table 3 are observed.

Table 3

| Precursor | amount added | cAMP NaF added | cAMP No NaF added |
|---|---|---|---|
| Adenine | 3 mg/ml | 5.3 mg/ml | 2.2 mg/ml |
| Adenosine | 4 | 4.7 | 2.1 |
| Hypoxanthine | 3 | 5.5 | 1.8 |
| Inosine | 4 | 4.3 | 2.1 |
| AICA | 3 | 4.3 | 1.9 |

EXAMPLE 10

In this example, Microbacterium sp. ATCC 21376 is used as a seed microorganism and cultivated according to the method of Example 6. However, the precursors as shown in Table 4 are added to respective fermentation media 20 hours after the start of cultivation, and cultivation is carried out at 30°C for 72 hours. The results are shown in Table 4.

Table 4

| Precursor | cAMP NaF added | cAMP No NaF added |
|---|---|---|
| 5'-inosinic acid | 2.3 mg/ml | 0.4 mg/ml |
| 5'-adenylic acid | 1.8 | 0.6 |
| AICARP* | 1.7 | 0.5 |

*5-amino-4-imidazolecarboxamide ribotide

EXAMPLE 11

In this example, cultivation is carried out in the same manner as in Example 6. However, in this example, 100 mg/l of magnesium fluoride is added in place of sodium fluoride. As a result, 9.5 mg/ml of cAMP is accumulated in the culture broth. In the medium of a control where no magnesium fluoride is added, only 2.4 mg/ml of cAMP is accumulated.

EXAMPLE 12

In this example, cultivation is carried out for 72 hours in the same manner as in Example 6, except that 100 mg/l of lithium fluoride is added in place of sodium fluoride. As a result, 9.3 mg/ml of cAMP is accumulated in the culture liquor. In the medium of a control where no lithium fluoride is added, only 2.2 mg/ml of cAMP is formed.

What is claimed is:

1. A process for producing adenosine-3',5'-cyclic monophosphoric acid which consists essentially of culturing a microorganism capable of producing said adenosine-3',5'-cyclic monophosphoric acid and belonging to a species selected from the group consisting of *Corynebacterium murisepticum*, Arthrobacter sp. (ATCC 21375) and Microbacterium sp. (ATCC 21376) in an aqueous nutrient medium consisting essentially of assimilable carbon sources, assimilable nitrogen sources, inorganic salts, nutrients required by said microorganism and from 1 mg/l to 2000 mg/l of at least one fluoride; accumulating adenosine-3',5'-cyclic monophosphoric acid in said culture medium and isolating said adenosine-3',5'-cyclic monophosphoric acid therefrom.

2. A process according to claim 1 wherein said microorganism is *Corynebacterium murisepticum* ATCC 21374.

3. A process according to claim 1 wherein said microorganism is Arthrobacter sp. ATCC 21375.

4. A process according to claim 1 wherein said microorganism is Microbacterium sp. ATCC 21376.

5. A process according to claim 1 wherein said fluoride is selected from the group consisting of sodium fluoride, potassium fluoride, calcium fluoride, magnesium fluoride, lithium fluoride, barium fluoride, ammonium fluoride and zinc fluoride.

6. A process according to claim 5 wherein the microorganism is *Corynebacterium murisepticum* ATCC 21374.

7. A process according to claim 5 wherein the microorganism is Arthrobacter sp. ATCC 21375.

8. A process according to claim 5 wherein the microorganism is Microbacterium sp. ATCC 21376.

* * * * *